Feb. 2, 1965     E. V. BOBLETT     3,168,726
APPARATUS FOR THERMOPLASTIC READOUT
Filed Jan. 6, 1961     2 Sheets-Sheet 1
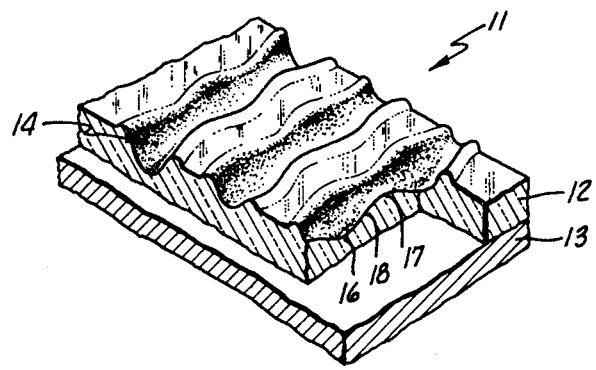
FIG_1
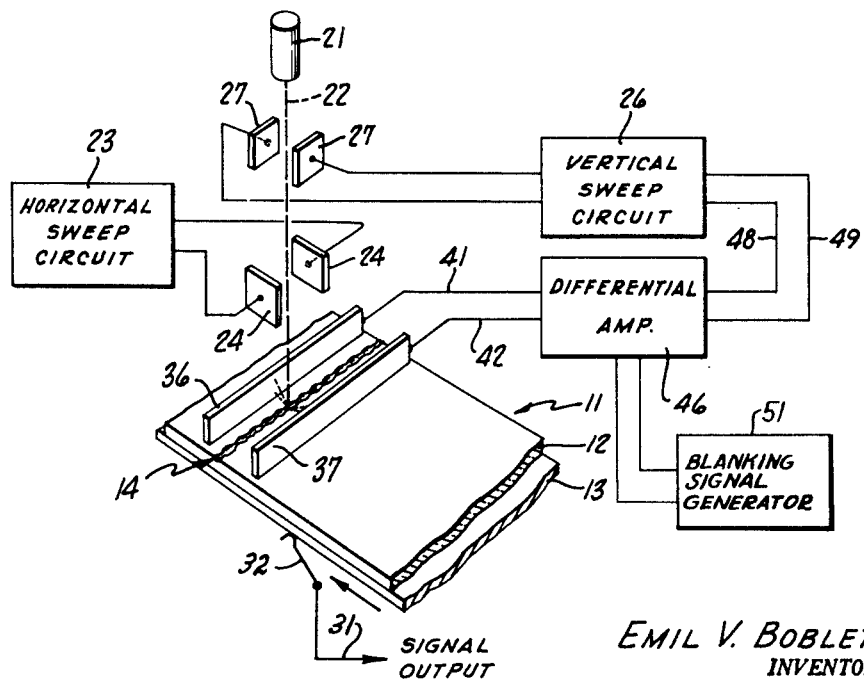
FIG_2
EMIL V. BOBLETT
INVENTOR.
BY Robert H. Clay
ATTORNEY

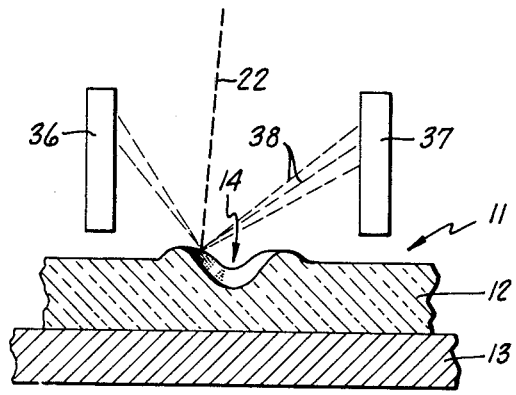
FIG_3
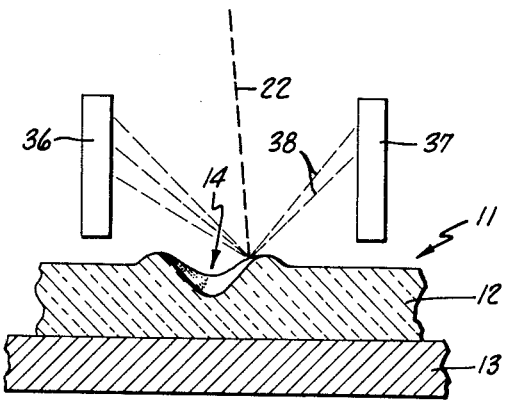
FIG_4
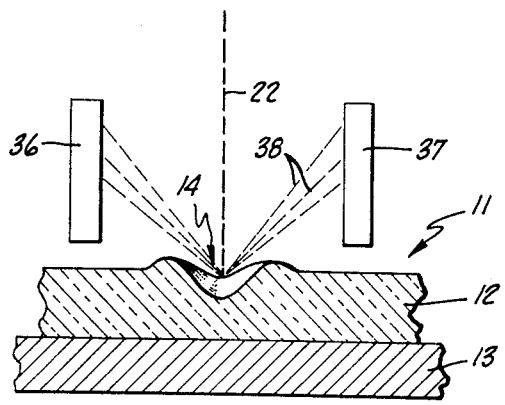
FIG_5
EMIL V. BOBLETT
INVENTOR.
BY Robert G. Clay
ATTORNEY

United States Patent Office 3,168,726
Patented Feb. 2, 1965

3,168,726
APPARATUS FOR THERMOPLASTIC READOUT
Emil V. Bobiett, Los Altos Hills, Calif., assignor to Ampex Corporation, Redwood City, Calif., a corporation of California
Filed Jan. 6, 1961, Ser. No. 81,010
13 Claims. (Cl. 340—173)

The present invention relates to a method and apparatus for electronic readout of information recorded on a thermoplastic medium.

A system has recently been developed and announced whereby information, such as video signals, may be recorded on a thermoplastic medium and stored for optical readout. In general, such system requires modulation of an electron beam in accordance with the information to be recorded. The modulated beam of electrons is then directed in raster fashion upon a heated thermoplastic medium. Electrons from the beam (or secondary positive charges) are deposited on the heated medium, the viscosity of which is such that the electrostatic forces induced by the electrons deform the surface thereof into topographical contours related to the information. Each line of scan then contains a series of craters, the depth and width of which is directly related to the intensity of the electron beam. Thus, a maximum value of electron beam results in a deep and wide indentation in the surface and a minimum value results in a shallow and narrow indentation. Intermediate values result in proportionately intermediate indentations. When the medium cools, the aforementioned indentations or deformities of the surface remain in the surface until a subsequent heating erases the indentations.

The information recorded in the foregoing manner may then be reproduced by an optical system whereby a source of light is projected through the medium to provide a visual image. The required optical system is necessarily complex and expensive to eliminate some of the inherent effects resulting from the mode of recordation. Where it is desired to obtain an electrical readout of the recorded information, a thin pencil beam of light may be used to scan the recorded information with a photocell suitably mounted to convert the emergent light into electrical signals. This latter system requires considerable electronic processing circuits to provide a useful composite signal representative of the scanned information.

It is therefore an object of the present invention to provide a new and improved method and apparatus for thermoplastic readout.

Another object of the invention is to provide an electronic readout system for recorded information on thermoplastic mediums.

Still another object of the invention is to provide a system for reproducing recorded information on a thermoplastic medium with an electron beam.

A further object of the invention is to provide a system for positioning the electron beam at the center of a recorded scan line and maintaining such position.

According to the present invention an electron beam is caused to scan a thermoplastic medium having information recorded theron. Secondary electrons formed at the surface are collected at a pair of electrodes disposed on either side of the beam transverse to the direction of travel of the beam scanning motion in one form of readout. The number of secondary electrons at the respective electrodes is then processed to provide a signal proportional to the depth of the track and to the slope thereof. Thus, the proportional signal is directly related to the recorded signal information. Another similar form of readout is obtained by using electron multipliers in place of the electrodes to collect the secondary electrons. Another, and simpler, form of readout may be used where the thermoplastic medium is carried on a conductive base, in which instance a capacitive effect is utilized by merely connecting an output lead to the base to obtain a signal proportional to the recorded information.

Also, in accordance with the invention a pair of electrodes, or electron multipliers, is disposed on opposite sides of the beam parallel to the direction of the scanning motion thereof. The number of secondary electrons reaching the pick-up elements is a function of the slope of the sides of the recorded track. When suitably processed the difference between the secondary electron currents becomes a signal proportional to the lateral position of the beam with respect to the center of the track. By suitably applying such proportional signal to the deflection plates associated with the electron beam, the beam can then be made to accurately follow the center of the track.

Other objects and advantages of the invention will be apparent from the following description and claims considered together with the accompanying drawing, in which:

FIGURE 1 is an enlarged view of a section of thermoplastic recording medium showing topographical contours formed during the recording process;

FIGURE 2 is a schematic diagram of a readout system in accordance with the present invention;

FIGURE 3 is a cross sectional view of a recorded track illustrating one condition of operation of the invention of FIGURE 2;

FIGURE 4 is a cross sectional view of the recorded track of FIGURE 3 illustrating a second condition of operation of the invention; and FIGURE 5 is a cross sectional view of the recorded track of FIGURE 3 illustrating the condition of centered tracking.

Referring to FIGURE 1 in detail, there is shown a section of thermoplastic recording medium 11 having a thin layer of thermoplastic material 12 carried on a base material 13 of conductive and heat resistant properties for mechanical support. While the base 13 has been shown as a single layer, a composite base may be used and comprise, for example, various layers of different materials such as polyethylene, Mylar, polycarbonate, cellulose, triacetate, glass, chromium, cuprous iodide, gold and many others. Such materials may be combined in composite layer form in a large number of combinations, depending on the particular form of recording and readout being utilized. For the purpose of simplification of description of the present invention the base material 13, as described above and referenced hereinafter, is one having conductive and heat resistant properties.

When a beam of electrons is directed to impinge upon a suitably heated thermoplastic medium 12 electrons are deposited at the surface. With the medium 12 heated to a point where the viscosity is low, the electrostatic forces between the surface at which the electrons are incident and the charge induced on the opposite surface deform the heated surface. Thus, where a modulated beam of electrons scans across the surface of a heated thermoplastic material 12 in the manner of a television raster, a series of grooves 14 are formed across the medium. The depth of the groove and the steepness of the sides are then indicative of the intensity of the incident beam. Thus, a high intensity beam results in a deep depression 16 having steep sides, a low intensity beam results in a shallow depression 17 with gently sloping sides, and intermediate intensities of beam result in intermediate depressions 18. By permitting the medium 12 to cool and information has been recorded thereon the depressions become a permanent record of the various beam intensities in scanning a line across the medium.

During recording an electron gun 21, as shown in FIGURE 2, produces an electron beam 22 that is intensity modulated by conventional means (not shown) in accordance with an input signal to be recorded, such as a composite video signal. A rectangular raster may be scanned, in the system shown in FIGURE 2, by energizing a horizontal sweep circuit 23 to apply suitable potentials at two horizontal deflection plates 24 for deflecting the beam 22 across the medium 12. During the synchronizing signal portion of the composite video signal, the medium may be moved by suitable transport means (not shown) into position for the next scan line. Alternatively, a vertical sweep circuit 26 may be energized to provide suitable potentials at two vertical deflection plates 27 to move the beam into position to scan a next succeeding horizontal line across the medium 12. Synchronization of the two sweep circuits 23 and 26 is conventional in the television art and, for simplicity of description of the invention, is not further detailed.

With the electron beam 22 modulated and controlled in accordance with the foregoing and the thermoplastic material 12 heated to have a suitable low viscosity, a permant record (only one line of which is shown in FIGURE 2) is made of the information of the modulation signal. It is to be realized that the foregoing elements are necessarily enclosed in an evacuated envelope, together with the required transport system, which has not been detailed because it is within the knowledge of the magnetic recorder art. Also, heating means for the thermoplastic material 12 have not been shown as many such systems are commercially available for direct use in or adaptation to the present system. In addition to the foregoing it is to be noted that the elements of electron beam forming gun 21 will necessarily be subject to atmospheric conditions when it is desired to remove the recorded information and that the skilled of the art has presently developed elements to withstand the conditions of recurrent exposure to atmosphere.

Having formed a permanent record of the desired information, the next step is to reproduce the same in a useful form. Heretofore, the reproduce process has been accomplished optically by a beam of light projected through the medium 11 and focussed frame-by-frame where the information can be intelligently understood by a viewer, such as picture images. Where the information is nonintelligible to a viewer, the optical system has to be modified to provide a scanning spot of light with a photocell to convert the emergent light into electrical signals that can be suitably processed by electronic circuitry into a useable form.

In accordance with the present invention, a simple readout system using substantially the same components as required for recording is achieved. Thus, the thermoplastic material 12 bearing the recorded information in raster form is suitably transported in a playback manner within the range of an electron beam 22, as formed by the electron gun 21 without any signal modulation. Electron beam readout (EBR) may then be accomplished in several different modes. One such mode, as also shown in FIGURE 2, requires a conductive base or substrate 13 for the thermoplastic material 12 with a signal output lead 31 connected thereto, as by a sliding contact 32, for example. The ground connections and associated electronic circuitry that may be utilized with the invention have been omitted for the purposes of simplification. The associated electrical or electronic circuits are well known and do not form a part of this invention. As the electron beam 22 is moved along the recorded track 14 under the influence of the horizontal sweep circuit 23, electrons of the beam or positive ions left from secondary emission of electrons capacitively induce potentials at the conductive layer 13 proportional to the thickness of the thermoplastic material 12 within the groove. Thus, the potential of the lead 31 varies in proportion to the recorded information and may be simply converted to useful form without the requirement for optical-effect corrections that are inherent in the former modes because of the width and lateral thickness variations of the groove 14. The lead 31 and the contact 32 may be considered a means for sensing the signal information reproduced by the electron beam.

Since the output signal in the foregoing system is proportional to the thickness of the thermoplastic material 12 within the groove 14, false signals result when the electron beam is not property tracking the center of the groove. The grooves 14 are narrow and a slight displacement to either side of the center as shown in FIGURES 3 and 4) may easily result in missing a signal by bypassing a variation in depth or otherwise giving an inaccurate signal. Thus, the provision of accurate tracking of the center of the groove 14 by the electron beam 22 is an important feature of the present invention.

In accordance with the present invention then, two electrodes 36 and 37, as shown in FIGURE 2, are suitably mounted parallel to and equally spaced on either side of the groove 14 being scanned with the electron beam 22 projected between the electrodes. Should the beam 22 be improperly directed so as to be incident on one side of the center of the groove 14 (see FIGURE 3) or on the other side (see FIGURE 4), secondary electrons 38 resulting from the impact of electrons of the beam on the thermoplastic material 12 are suitably collected to provide an indication of the direction and amount of beam deviation from the center of the groove 14. To such end the electrodes 36 and 37 are respectively connected by leads 41 and 42 to the input of a differential amplifier 46 that develops an output potential having a polarity indicating the direction of deviation and a magnitude proportional to the amount of deviation. The output of the differential amplifier 46 is then applied to the vertical sweep circuit 26 to correct the deviation by changing the potentials applied at the deflection plates 27. The output of the differential amplifier 46 may be suitably blanked as by operation of the blanking signal generator 51, during the period between the horizontal scanning lines in the manner employed in the television art.

Referring again to FIGURES 3 and 4, it is to be noted that, when the electron beam 22 is directed to one side or the other of the center of the groove 14, the slope of the side upon which the beam is incident results in more secondary electrons 38 being directed to the more remote electrode than to the nearer one. Also, as shown in FIGURE 5, when the electron beam 22 is properly tracking the center of the groove 14, an equal number of secondary electrons 38 is received by the respective electrodes 36 and 37 so that no output potential is developed at the output of the differential amplifier 46.

In the foregoing it has been set forth that the two electrodes 36 and 37 are symmetrically mounted with respect to the center of one groove 14 and this also applies to equal height above the surface of the recording medium 11. It is to be understood, however, that more than one line may be scanned before movement of the recording medium 11, in which instance the position of the electrodes 36 and 37 has to be varied according to the particular one of the several lines or grooves being scanned by the beam 22. If amplification of the secondary electron currents is desired prior to application to the differential amplifier 46, electron multipliers may be used with the respective pickup dynodes being disposed in the positions of the described electrodes 36 and 37.

There has been described in the foregoing a new and improved readout system for information recorded on a thermoplastic medium including means for maintaining the scanning operation accurately aligned with the center of the groove being scanned. While the salient features of the present invention have been described and illus-

What is claimed is:

1. In a readout system for information recorded in track form on a thermoplastic medium, the combination comprising: a beam of electrons; means for directing the beam substantially transversely to and along a track of recorded information on the medium; and means for developing a signal proportional to the recorded information in response to electrical charges resulting from the incidence of the beam on the medium.

2. In a readout system for information recorded on a thermoplastic medium, the combination comprising: a beam of electrons; means for directing the beam in a scanning motion along a line of information recorded on the medium; means for developing a signal proportional to the recorded information in response to electrical charges resulting from the incidence of the beam on the medium; means for developing an error signal proportional to deviation of the beam from the line of information; and means for applying the error signal to the directing means to correct the deviation.

3. In a readout system for information recorded on a thermoplastic medium, the combination comprising: a beam of electrons; means for directing the beam in a scanning motion along a line of information recorded on the medium; means for developing a signal proportional to the recorded information in response to electrical charges resulting from the incidence of the beam on the medium; means for collecting secondary electrons resulting from the incident beam to develop an error signal proportional to deviation of the beam from the line of information; and means for applying the error signal to the directing means to correct the deviation.

4. In a readout system for information recorded on a thermoplastic medium, the combination comprising: a beam of electrons; means for directing the beam in a scanning motion along a line of information recorded on the medium; means for developing a signal proportional to the recorded information in response to electrical charges resulting from the incidence of the beam on the medium; first and second means respectively disposed on either side of the beam parallel to the direction of motion thereof for collecting secondary electrons resulting from the incident beam; means coupled to the first and second means for developing an error signal proportional in magnitude to degree of deviation of the beam from the line of information and proportional in polarity to the direction of deviation of the beam; means for applying the error signal to the directing means to correct the deviation.

5. In a readout system for information recorded in parallel lines on a thermoplastic layer having a conductive base, the combination comprising: means for forming a beam of electrons; means for directing the beam to sequentially scan the lines of information recorded on the thermoplastic layer; and means coupled to the conductive base for capacitively sensing the charge induced by the incident beam as a function of the recorded information.

6. In a readout system for information recorded on a thermoplastic medium, the combination comprising: means for forming a beam of electrons; means for directing the beam to scan the recorded information; and means for sensing the recorded information in response to the incident beam.

7. In a readout system for information recorded in raster type form on a thermoplastic medium, the combination comprising: means for forming a beam of electrons; deflection means for directing the beam along lines of recorded information; means for shifting the beam from the end of one line to the beginning of a subsequent line; and means for sensing the recorded information in response to the incident beam.

8. In a readout system for information recorded in raster-type form on a thermoplastic medium, the combination comprising: means for forming a beam of electrons; first deflection means for directing the beam forward and backward along lines of recorded information with a blanking period provided between the end of one line and the beginning of the next line; second deflection means for shifting the beam in a direction transverse to the line of recorded information during the blanking period; means for sensing the recorded information in response to the incident beam; means for developing an error signal proportional to deviation of the beam from the line being scanned; and means for applying the error signal to the second deflection means to correct the deviation of the beam from the line between blanking periods.

9. In a readout system for information recorded in raster-type form on a thermoplastic medium, the combination comprising: means for forming a beam of electrons; first deflection means for directing the beam forward and backward along the lines of recorded information with a blanking period provided between the end of one line and the beginning of the next line; second deflection means for shifting the beam in a direction transverse to the lines of recorded information; means for moving the medium a distance equal to spacing between lines of information of the raster during the blanking period; means for sensing the recorded information in response to the incident beam; means for developing an error signal proportional to deviation of the beam from the line being scanned; and means for applying the error signal to the second deflection means to correct the deviation of the beam from the line between blanking periods.

10. The combination of claim 9 wherein the means for developing an error signal comprises first and second secondary electron collectors respectively disposed on opposite sides of the beam parallel to motion of the beam along the lines of recorded information.

11. The combination of claim 9 wherein the means for applying the error signal comprises a differential amplifier having an output proportional in magnitude to the amount of deviation and a polarity proportional to the direction of deviation.

12. In a readout system for information recorded on a thermoplastic medium in the form of an irregular topography, the combination comprising: a means for producing a beam of electrons; means for impinging the beam in a scanning motion on a line along the irregular topography of the medium to develop a signal related to said topography; and means for sensing said signal whereby the information recorded in the form of an irregular topography is translated into a readout signal.

13. In a readout system for information recorded on a thermoplastic medium in the form of an irregular topography, the combination comprising: means for producing a beam of electrons; means for impinging the beam in a scanning motion on a line along the topography of the medium to develop a signal related to said topography; means for sensing said signal; and means for developing an error signal proportional to deviation of the beam from said line, said error signal resulting from the impinging of said topography with said electron beam.

References Cited in the file of this patent

UNITED STATES PATENTS

| | | |
|---|---|---|
| 2,422,140 | Sinnett | June 10, 1947 |
| 2,681,382 | Hilburn | June 15, 1954 |
| 2,692,945 | Beaumont | Oct. 26, 1954 |
| 2,698,928 | Pulvari | Jan. 4, 1955 |
| 2,851,521 | Clapp | Sept. 9, 1958 |